United States Patent [19]
Tashima et al.

[11] Patent Number: 5,936,010
[45] Date of Patent: Aug. 10, 1999

[54] PROCESS FOR PRODUCING HIGHLY REACTIVE LOW-VISCOSITY MODIFIED PHENOLIC RESINS

[75] Inventors: Masao Tashima; Hiromi Miyasita; Makoto Hasegawa; Kaneyoshi Oyama; Tomoaki Fujii, all of Kamisu-machi, Japan

[73] Assignee: Kashima Oil Co., Ltd., Tokyo, Japan

[21] Appl. No.: 09/061,324

[22] Filed: Apr. 17, 1998

Related U.S. Application Data

[62] Division of application No. 08/797,631, Feb. 7, 1997, Pat. No. 5,792,826.

[30] Foreign Application Priority Data

Feb. 9, 1996 [JP] Japan ......................... 8-24173
Oct. 15, 1996 [JP] Japan ......................... 8-272576

[51] Int. Cl.$^6$ ............................ C08L 63/00; C08L 61/04; C08L 61/06; C08G 8/28
[52] U.S. Cl. .................... 523/400; 523/424; 525/481; 525/485; 525/486
[58] Field of Search ................. 523/400, 424; 525/481, 485, 486

[56] References Cited

U.S. PATENT DOCUMENTS

| | | | |
|---|---|---|---|
| 2,237,634 | 4/1941 | Rosen | 528/160 |
| 2,330,827 | 10/1943 | Kesler | 528/160 |
| 3,406,132 | 10/1968 | Winegartner | 528/160 |
| 4,187,369 | 2/1980 | Pavlikov et al. | 528/160 |
| 4,350,623 | 9/1982 | Robinson et al. | 528/160 |
| 4,395,498 | 7/1983 | Benham | 528/160 |
| 5,432,240 | 7/1995 | Tsumura et al. | 525/481 |
| 5,484,854 | 1/1996 | Tsumura et al. | 525/481 |
| 5,521,259 | 5/1996 | Tsumura et al. | 525/481 |

FOREIGN PATENT DOCUMENTS

| | | |
|---|---|---|
| 0 612 776 | 8/1994 | European Pat. Off. . |
| 0 665 249 | 8/1995 | European Pat. Off. . |
| 0 687 703 | 12/1995 | European Pat. Off. . |
| 256234 | 3/1970 | Russian Federation ............ 528/160 |
| 279049 | 12/1970 | Russian Federation ............ 528/160 |
| 798120 | 1/1981 | Russian Federation ............ 528/160 |

OTHER PUBLICATIONS

Patent Abstracts of Japan, JP 61–235413, Oct. 20, 1986.
Patent Abstracts of Japan, JP 2–274714, Nov. 08, 1990.
Patent Abstracts of Japan, JP 4–145116, May 19, 1992.
Patent Abstracts of Japan, JP 6–228257, Aug. 16, 1994.
Patent Abstracts of Japan, JP 7–252339, Oct. 03, 1995.
Patent Abstracts of Japan, vol. 095, No. 005, Jun. 30, 1995, JP–A–07 048427, Feb. 21, 1995.
Patent Abstracts of Japan, vol. 095, No. 005, Jun. 30, 1995, JP–A–07 052352, Feb. 28, 1995.

*Primary Examiner*—Peter A. Szenkely
*Attorney, Agent, or Firm*—Oblon, Spivak, McClelland, Maier & Neustadt, P.C.

[57] ABSTRACT

A process for producing a highly reactive low-viscosity modified phenolic resin comprising the steps of polycondensating a petroleum heavy oil or pitch, a formaldehyde polymer, and a phenol in the presence of an acid catalyst to prepare a modified phenolic resin; and reacting the resultant modified phenolic resin with the phenols at a temperature higher than 120° C. and not more than 200° C. in the presence of the acid catalyst to lower the molecular weight of the modified phenolic resin. The highly reactive low-viscosity modified phenolic resin obtained according to this process has high reactivity with epoxy resins and low resin melt viscosity. In addition, this resin can be used for producing a molding material having good moldability and considerably low moisture absorption when combined with an epoxy resin.

7 Claims, No Drawings

PROCESS FOR PRODUCING HIGHLY REACTIVE LOW-VISCOSITY MODIFIED PHENOLIC RESINS

This application is a Divisional of application Ser. No. 08/797,631, filed on Feb. 7, 1997, now U.S. Pat. No. 5,792,826.

FIELD OF THE INVENTION

The present invention relates to a process for producing a highly reactive, low-viscosity modified phenolic resin which is low in resin melt viscosity and combinable with an epoxy resin to form a molding material which is excellent in moldability and has low moisture absorption characteristics to provide an improved dimensional stability with no change in dimension caused due to moisture absorption. The present invention also relates to molding materials, materials for electrical and electronic parts and semiconductor sealers, based on a modified phenolic resin comprising the highly reactive, low-viscosity modified phenolic resin obtained through this process and an epoxy resin.

BACKGROUND OF THE INVENTION

The phenolic resin provides a molding excellent in mechanical properties, and hence has widely been employed from of old either independently or in the form of a blend with another resin, such as an epoxy resin. However, the phenolic resin per se and blend have drawbacks in that their light and alkali resistance is relatively low, that they are likely to absorb water or an alcohol to thereby suffer from changes in the dimension and electrical resistance, and that the thermal resistance, especially the oxidation resistance at high temperatures, thereof is poor.

In order to overcome the drawbacks, various modifications of the phenolic resin have been studied. For example, various modified phenolic resins have been proposed, which have improved resistance to deterioration and oxidation due to light, chemicals, etc. by virtue of the modification using a fat, an oil, a rosin or a neutral aromatic compound.

For example, Japanese Patent Laid-Open Publication No. 61(1986)-235413 discloses a phenolic resin having excellent thermal resistance, obtained by selecting reactants of a phenol-modified aromatic hydrocarbon resin. However, the phenolic resin obtained by this method is disadvantageously not cured unless being maintained at a high temperature for a prolonged period of time in the manufacturing of a molding by the use thereof.

Japanese Patent Laid-Open Publication No. 2(1990)-274714 discloses that a modified phenolic resin useful for a molding material, having excellent thermal and oxidation resistance and mechanical strength as cannot be expected from the conventional phenolic resin, is obtained by employing a petroleum heavy oil or pitch, which is a cheap material, as a modifier material and by selecting specific reaction conditions.

Further, Japanese Patent Laid-Open Publication No. 4(1992)-145116 discloses that, in the production of such a phenolic resin, a crude modified phenolic resin obtained by a polycondensation of starting compounds is subjected to a neutralization treatment, a water washing treatment and/or an extraction treatment to thereby neutralize and remove any acid remaining in the crude modified phenolic resin, so that a modified phenolic resin which does not corrode a metal member brought into contact with the resin is provided.

In the above process for producing the modified phenolic resin, the acid remaining in the crude modified phenolic resin is actually neutralized and removed by the neutralization treatment using an amine, followed by the water washing treatment. However, the modified phenolic resin obtained through the purification step involving the above neutralization and water washing treatments is likely to retain a neutralization product therein, so that there is a problem that it is unsatisfactory as a molding material used for a product on which strict requirements for thermal and corrosion resistance are imposed, such as a molding material for electrical or electronic part and a material for semiconductor sealer.

Japanese Patent Laid-Open Publication No. 6(1994)-228157 teaches that a modified phenolic resin containing substantially no acid can be obtained by purifying a crude modified phenolic resin through a purification step including a specific extraction treatment. The modified phenolic resin containing substantially no acid, obtained through this purification step, may be combined with an epoxy resin, so that a molding material can be obtained, which not only has excellent thermal and moisture resistance but also does not corrode any metals.

However, the above modified phenolic resin has a drawback in that the melt viscosity of the resin is so high that the resin is not suitable for speedy mass production of a molded article having a complex configuration. In addition, further improvements of thermal resistance, dimensional stability and strength and other mechanical properties have been demanded in the use of the modified phenolic resin in combination with an epoxy resin.

The present inventors proposed a process for producing a highly reactive modified phenolic resin having a low resin melt viscosity and an improved reactivity with the epoxy resins by means of reacting a modified phenolic resin with phenols in the presence of an acid catalyst to thereby lower the molecular weight of the modified phenolic resin (Japanese Patent Laid-Open Publication No. 7(1995)-252339).

In the molecular weight lowering step of this process, it is considered that the acetal bonding and/or methylene ether bonding present in the molecule of the modified phenolic resin is broken and dissociated to thereby lower the molecular weight of the modified phenolic resin and that phenols are bonded to dissociation terminals to increase a phenol content. Therefore, the molecular weight lowering reaction is typically carried out at a temperature at which the acetal bonding and/or methylene ether bonding in the modified phenolic resin molecules are cleaved and dissociated, i.e., 50–120° C.

The highly reactive modified phenolic resins obtained as described above are relatively low in viscosity and are capable of providing a molding material having good thermal resistance and moldability, as well as superior mechanical strength such as dimensional stability when combined with an epoxy resin.

However, the viscosity of the highly reactive modified phenolic resin obtained in the process described above is not sufficiently low though it is significantly lower than those of the conventional modified phenolic resins. Especially, in the application for semiconductor sealers, there has been a demand for a lower viscosity to further improve the moldability while maintaining a high reactivity with the epoxy resin.

In this connection, resin molding materials tend to be expanded when they absorb moisture to deteriorate the dimensional stability. When the resin molding material is used for a composite material with a metal such as resin portions of electrical or electronic parts and, in particular, for the semiconductor sealers, the moisture adsorbed by the resultant resin package rapidly vaporizes during solder mounting at a high temperature. This causes swelling and cracks of the resin package. The resin portions containing moisture may corrode a metal portion, significantly affecting lifetime and reliability of a resultant product. It has thus been desired to reduce moisture absorption of the molding material comprising the highly reactive modified phenolic resin described above, for the applications where the moisture absorption of the molding material is undesirable.

The inventors have made extensive and intensive studies with respect to such drawbacks associated with the prior art. As a result, it has been found that a modified phenolic resin having a lower viscosity that cannot be obtained by a conventional molecular weight lowering reaction is produced while maintaining a high reactivity with epoxy resins by means of reacting a reaction product of polycondensation reaction as it is or after subjecting to purification with a phenol at a certain temperature condition in the absence of a formaldehyde polymer and other cross-linking agents and in the presence of an acid catalyst to lower the molecular weight thereof, and that a molding material formed of a combination of this modified phenolic resin and an epoxy resin has a lower moisture absorption. The present invention was thus completed.

OBJECT OF THE INVENTION

The present invention is made with a view toward overcoming the above mentioned problems in the prior art. An object of the present invention is to provide a process for producing a highly reactive low-viscosity modified phenolic resin which has a high reactivity with epoxy resins and a particularly low resin melt viscosity, and which can provide a molding material having good moldability and a low moisture absorption when being combined with an epoxy resin.

Another object of the present invention is to provide a process for producing a highly reactive modified phenolic resin, which is suitable for producing a modified phenolic resin containing substantially no acid, so that it does not exhibit no corrosive action, in addition to having the above low resin melt viscosity and marked improvement in the reactivity with epoxy resins.

It is yet another object of the present invention to provide a molding material, in particular, including materials for electrical and electronic parts and semiconductor sealers which comprises the highly reactive low-viscosity modified phenolic resin having the resin melt viscosity at 150° C. of from 0.2 to 4.5 poises capable of accomplishing by the process of the present invention and an epoxy resin, and which is excellent in moldability and capable of giving molded articles having low moisture absorption.

SUMMARY OF THE INVENTION

A process for producing a highly reactive low-viscosity modified phenolic resin according to the present invention comprising the steps of polycondensating a petroleum heavy oil or pitch, a formaldehyde polymer, and a phenol in the presence of an acid catalyst to prepare a modified phenolic resin; and reacting the resultant modified phenolic resin with phenols at a temperature higher than 120° C. and not more than 200° C., and preferably from 140° C. to 180° C. in the presence of an acid catalyst but substantially in the absence of an formaldehyde polymer as a cross-linking agent to thereby lower the molecular weight of the modified phenolic resin.

Examples of the phenol advantageously used in the process of the present invention include hydroxybenzene compounds and hydroxynaphthalene compounds. In particular, the resultant highly reactive low-viscosity modified phenolic resin has a particularly low resin melt viscosity when a hydroxybenzene compound is used as the phenol in the molecular weight lowering step. On the other hand, the thermal resistance and the resistance to moisture absorption of the resultant highly reactive low-viscosity modified phenolic resin is especially improved when the hydroxynaphthalene compound is used as the phenol in the molecular weight lowering step.

In the process for producing a highly reactive low-viscosity modified phenolic resin according to the present invention, it is preferred that, in the polycondensation step, a mixture containing the petroleum heavy oil or pitch and the formaldehyde polymer in a ratio of the number of moles, in terms of formaldehyde, of the formaldehyde polymer to that of the petroleum heavy oil or pitch of 1:1 to 15:1 be heated under agitation in the presence of an acid catalyst, and that the phenol be gradually added to the mixture while being heated under agitation until a ratio of the number of moles of the phenol to that of the petroleum heavy oil or pitch of 0.3:1 to 5:1 to thereby effect the polycondensation of these starting materials.

In the present invention, the modified phenolic resin prepared in the polycondensation step may be treated with (i) a solvent containing at least one compound selected from the group consisting of aliphatic and alicyclic hydrocarbons each having up to 10 carbon atoms and/or (ii) an extraction solvent capable of dissolving the acid catalyst used in the polycondensation in a solubility of 0.1 or less and a major portion of the modified phenolic resin, in order to extract and remove solvent-soluble components containing unreacted components and/or catalyst residues, as well as the formaldehyde polymer as the cross-linking agent, so that the resultant modified phenolic resin is purified prior to subjecting it to the molecular weight lowering step. Thus, it is effectively avoided to take with the acid catalyst residues and the formaldehyde polymer used in the polycondensation step into the molecular weight lowering step.

A molding material based on the modified phenolic resin according to the present invention comprises (A) the highly reactive low-viscosity modified phenolic resin having the resin melt viscosity at 150° C. of from 0.2 to 4.5 poises, particularly from 0.2 to 3.0 poises or from 1.0 to 4.5 poises, obtainable according to the process as described above and (B) an epoxy resin. The modified phenolic resin may also comprise (C) a curing agent and/or a curing accelerator, and (D) an inorganic filler in addition to the resin components (A) and (B).

It is preferable that the molding material based on the modified phenolic resin according to the present invention contain the highly reactive low-viscosity modified phenolic resin (A) and the epoxy resin (B) in a weight ratio of 10:90 to 90:10.

The material for the electrical and electronic parts according to the present invention is characterized in that it is produced by molding the above mentioned molding material based on the highly reactive low-viscosity modified phenolic resin.

The semiconductor sealer according to the present invention comprises the above molding material based on the highly reactive low-viscosity modified phenolic resin.

DETAILED DESCRIPTION OF THE INVENTION

The present invention will be described more in detail below.

In the process for producing the highly reactive low-viscosity modified phenolic resin according to the present invention, a modified phenolic resin obtained in a specific polycondensation step is lowered in its molecular weight in a molecular weight lowering step carried out under a specific condition particularly at a higher temperature than that in conventional processes to thereby produce the highly reactive low-viscosity modified phenolic resin.

In the polycondensation step of the process in the present invention, specifically, a petroleum heavy oil or pitch, a formaldehyde polymer, and phenols are polycondensed in the presence of an acid catalyst.

The petroleum heavy oil or the pitch used as a raw material in the above mentioned polycondensation reaction includes a distillation residue of crude oil, a hydrocracking residue, a catalytic cracking residue, a thermal cracking residue of naphtha or LPG, and a vacuum distillate, an extract by solvent extraction and thermal treatment products from such residues. It is preferred that a petroleum heavy oil or pitch having appropriate fraction of aromatic hydrocarbon (fa) and ratio of hydrogen of aromatic ring (Ha) be selected for use.

For example, it is preferred that the petroleum heavy oil or the pitch have a value of fa ranging from 0.40 to 0.95, particularly from 0.5 to 0.8, and a value of Ha ranging from 20 to 80%, particularly from 25 to 60%.

The fraction of aromatic hydrocarbon (fa) and the ratio of hydrogen of aromatic ring (Ha) are given by the following formulae from data obtained by $^{13}$C-NMR and $^1$H-NMR measurements on the petroleum heavy oil or the pitch, respectively.

$$fa \text{ value} = \frac{\text{number of aromatic carbon atoms in oil or pitch}}{\text{number of all carbon atoms in oil or pitch}}$$

$$Ha \text{ value} = \frac{\text{number of hydrogen atoms of aromatic rings in oil or pitch}}{\text{number of all hydrogen atoms in oil or pitch}} \times 100 \, (\%)$$

When the fa value of the petroleum heavy oil or pitch as a raw material is smaller than 0.4, the aromatic content is low, so that it is likely that the effect thereof on the improvement of the performance, such as thermal and oxidation resistance, of the resultant modified phenolic resin is less.

On the other hand, when the petroleum heavy oil or pitch has an fa value of greater than 0.95, the reactivity of hydrogen atoms of aromatic rings with formaldehyde is likely to become unfavorably low.

When the Ha value of the petroleum heavy oil or pitch as a raw material is smaller than 20%, the amount of aromatic ring hydrogen atoms reacting with formaldehyde is less to thereby cause the reactivity lowering, so that the effect thereof on the improvement of the performance of the phenolic resin is likely to become poor.

On the other hand, when a petroleum heavy oil or pitch having an Ha value of greater than 80% is used as a raw material, the strength of the modified phenolic resin is likely to become poor.

With respect to the aromatic hydrocarbon composing the petroleum heavy oil or pitch used in the present invention, the number of condensed rings is not particularly limited. However, it is generally preferred that the petroleum heavy oil or pitch be mainly composed of polycyclic aromatic hydrocarbons each having 2 to 4 condensed rings. When the petroleum heavy oil or pitch contains condensed polycyclic aromatic hydrocarbons each having at least 5 condensed rings at a high content, such condensed polycyclic aromatic hydrocarbons have generally high boiling points, e.g., over 450° C., so that boiling point variances become large and the aromatic hidrocarbons composing the petroleum heavy oil or pitch cannot be in the narrow range of the boiling point to thereby cause the quality of the product to be unstable. On the other hand, when the petroleum heavy oil or pitch is mainly composed of monocyclic aromatic hydrocarbons, the reactivity with formaldehyde is so low that the effect thereof on the improvement of the quality of the resultant phenolic resin is likely to become poor.

The formaldehyde polymer used as the raw material in combination with the petroleum heavy oil or the pitch in the present invention acts as a cross-linking agent. Specific examples of such formaldehyde polymer include linear polymers such as paraformaldehyde and polyoxymethylene (especially oligomer), and cyclic polymers such as trioxane.

In the polycondensation step of the process of the present invention, the petroleum heavy oil or pitch is mixed with the formaldehyde polymer in a ratio of the number of moles, in terms of formaldehyde, of the formaldehyde polymer to the number of moles, calculated from the average molecular weight thereof, of the petroleum heavy oil or pitch of generally from 1 to 15, preferably from 2 to 12, and still preferably from 3 to 11.

When the above mixing ratio of the formaldehyde polymer to the petroleum heavy oil or pitch is less than 1, the strength of a cured molding from the resultant modified phenolic resin would be unfavorably low. On the other hand, when the above-mentioned mixing ratio is greater than 15, the properties and yields of obtained cured moldings would no longer vary, so that the use of the formaldehyde polymer in the ratio greater than 15 would be useless. The excess use of the formaldehyde polymer has a possibility of hindering the lowering of the molecular weight of the modified phenolic resin in the below described molecular weight lowering step.

Specific examples of the phenols used as the raw material in the polycondensation step include hydroxybenzene compounds such as phenol, cresol, xylenol, resorcinol, catechol, hydroquinone, bisphenol A and bisphenol F; and hydroxynaphthalene compounds, for example, monohydroxynaphthalene compounds such as α-naphthol and β-naphthol, dihydroxynaphthalene compounds such as 1,2-dihydroxynaphthalene, 1,3-dihydroxynaphthalene, 1,4-dihydroxynaphthalene, 2,3-dihydroxynaphthalene, 3,6-dihydroxynaphthalene, 1,5-dihydroxynaphthalene, 1,6-dihydroxynaphthalene, 1,7-dihydroxynaphthalene, 2,6-dihydroxynaphthalene, and 2,7-dihydroxynaphthalene, and the above mentioned monohydroxynaphthalene and dihydroxynaphthalene compounds having a substituent including an alkyl group, an aromatic group, or a halogen atom, such as 2-methyl-1-naphthol, 4-phenyl-1-naphthol, 1-bromo-2-naphthol, and 6-bromo-2-naphthol. These compounds may be used alone or in a combination of two or more of them.

The above phenols are added to the raw material mixture until a ratio of the number of moles of the phenol to the number of moles, calculated from the average molecular weight thereof, of the petroleum heavy oil or pitch of generally 0.3 to 5, preferably from 0.5 to 3.

When the above ratio is less than 0.3, the reactivity between the petroleum heavy oil or pitch and the formaldehyde is lower than that between the phenol and the formaldehyde, so that it may occur that a satisfactory crosslinking density cannot be attained to thereby cause the strength of a cured molding to be poor as compared with that of the conventional phenolic resin. In particular, it is likely for the cured molding to exhibit unfavorably low impact resistance and hence brittleness. On the other hand, when the phenols are added in a ratio greater than 5, it is likely that the effect of the modification of the phenolic resin on the quality improvement is decreased.

In the polycondensation step of the process of the present invention, an acid catalyst is used for polycondensation of the petroleum heavy oil or pitch, the formaldehyde polymer and the phenol. BrØnsted or Lewis acids may be used as such an acid catalyst. BrØnsted acid is preferred. Examples of BrØnsted acids include toluenesulfonic acid, xylenesulfonic acid, hydrochloric acid, sulfuric acid and formic acid. Of these, p-toluenesulfonic acid and hydrochloric acid are particularly preferred.

The above acid catalyst is preferably used in an amount of 0.1 to 30% by weight, still preferably 1 to 20% by weight, relative to the total weight of the petroleum heavy oil or pitch, the formaldehyde polymer and the phenol.

When the amount of the added acid catalyst is too small, it is likely that the reaction time is unfavorably long, and that a satisfactory reaction cannot be attained unless the reaction temperature is elevated. On the other hand, when the amount of the acid catalyst is greater, the reaction rate is no longer increased in proportion to the amount thereof, so that a disadvantage in view of cost is likely to be incurred.

In the polycondensation step in which the above described raw materials and acid catalyst are employed, for example, it is preferred that the raw materials are polycondensed by gradually adding the phenol, until the above ratio, to a mixture containing in the above ratio the petroleum heavy oil or pitch and the formaldehyde polymer while being heated under agitation in the presence of the acid catalyst.

The phenol is preferably gradually added by dropping or other methods at a rate of 0.05 to 5 wt. %/min, still preferably 0.1 to 2 wt. %/min, relative to the total weight of the reaction mixture.

When the addition rate is less than 0.05 wt. %/min, the time required for the addition is too long, thereby increasing cost. On the other hand, when the addition rate exceeds 5 wt. %/min, the added phenol so rapidly reacts with free formaldehyde, that it is difficult to form a homogeneous mixture or condensate.

The reason for this heterogeneity would be that the reactivity of the formaldehyde is much greater with the phenol than with the petroleum heavy oil or pitch, so that, unless the initial concentration of the phenol is kept low, the formaldehyde undergoes a selective reaction with the phenol or a phenol-formaldehyde condensate formed by condensation reaction to thereby become sparingly soluble in the system.

In the polycondensation step of the process of the present invention, the time at which the phenol is added to the mixture of the petroleum heavy oil or pitch and the formaldehyde polymer is not particularly limited. However, it is preferred that the gradual addition of the phenol be initiated in a period of from a time at which the conversion of formaldehyde, estimated from the amount of remaining free formaldehyde, is substantially 0% to a time at which the conversion of formaldehyde is 70% or less, especially 50% or less.

When the conversion of formaldehyde exceeds 70%, the amount of formaldehyde capable of reacting with the added phenol is less, so that the performance of the resultant modified phenolic resin is likely to be deteriorated.

With respect to the heating and agitation of the mixture of the petroleum heavy oil or pitch and the formaldehyde polymer in the presence of the acid catalyst, the reaction temperature and time are determined, depending on the raw material formulation, the rate of addition of the phenol and the properties of the resin to be obtained. Naturally, the reaction temperature and the reaction time are mutually affecting factors. The heating under agitation of the above raw material mixture in the presence of the acid catalyst may preferably be conducted at 50 to 160° C., especially 60 to 120° C. for 0.5 to 10 hr, especially 1 to 5 hr.

When the production of the modified phenolic resin of the present invention is conducted by a batch process, the reaction can be performed in one stage, which is advantageous. Further, when the above production is conducted by a continuous process, it is not necessary to use an apparatus having been employed in the production of the conventional modified phenolic resin, in which a plurality of reaction materials must continuously be mixed in respective predetermined proportions and thus difficult control is inevitable. Instead, the continuous production can be performed by disposing a complete mixing type reactor vessel in the middle and introducing the phenol to be added thereinto at a predetermined rate. This allows an apparatus cost to be relatively low, and ensures good operability.

In the present invention, the polycondensation reaction of the petroleum heavy oil or pitch, the formaldehyde polymer and the phenol can be performed in the absence of a solvent. However, an appropriate solvent may be used to lower the viscosity of the reaction mixture (reaction system) so that uniform reaction is ensured.

Examples of such solvents include aromatic hydrocarbons, such as benzene, toluene and xylene; halogenated aromatic hydrocarbons, such as chlorobenzene; nitro-substituted aromatic hydrocarbons, such as nitrobenzene; nitro-substituted aliphatic hydrocarbons, such as nitroethane and nitropropane; and halogenated aliphatic hydrocarbons, such as perchloroethylene, trichloroethylene and carbon tetrachloride.

In the process for producing the highly reactive low-viscosity modified phenolic resin according to the present invention, the modified phenolic resin obtained by the above polycondensation reaction is used to the following molecular weight lowering step. In the molecular weight lowering step, the modified phenolic resin reacts with the phenol under a specific thermal conditions in the presence of an acid catalyst but in the absence of formaldehyde polymer and other crosslinking agents, so that the modified phenolic resin has a lowered molecular weight. In this molecular weight lowering step, the other reaction conditions and the amounts of raw materials and catalyst are controlled so that the modified phenolic resin has a desirable viscosity by the reaction thereof with the phenol.

Besides the modified phenolic resin, the acid catalyst, unreacted materials, low molecular weight components, solvent, etc. may remain in the reaction mixture obtained by the above polycondensation reaction, which affect the reaction conditions during the molecular weight lowering step and the amounts of raw materials and catalyst involved in the reaction. For example, when the modified phenolic resin for use in the molecular weight lowering step contains the acid catalyst, the amount of acid catalyst to be added in the above step is affected. Further, especially when the modified phenolic resin contains a large amount of formaldehyde polymer being a crosslinking agent as an unreacted component, the polycondensation of the modified phenolic resin, the formaldehyde polymer and the phenol possibly precedes to thereby hinder the lowering of the molecular weight of the modified phenolic resin.

Therefore, it is preferred that the modified phenolic resin for use in the molecular weight lowering step do not contain the acid catalyst, unreacted materials or the reaction solvent in an amount such that the molecular weight lowering reaction is hindered, especially do not contain the acid catalyst and formaldehyde polymer, from the viewpoint that the reaction conditions during the molecular weight lowering step are appropriately set so as to accomplish effective lowering of the molecular weight of the modified phenolic resin through the reaction thereof with the phenol.

The above modified phenolic resin may be prepared by appropriately controlling the amounts of raw materials, acid catalyst and reaction solvent employed in the polycondensation reaction or the polycondensation reaction conditions to thereby prevent excess unreacted components, acid catalyst and reaction solvent from remaining in the reaction mixture, or alternatively by appropriately purifying the reaction mixture obtained in the polycondensation reaction to thereby remove any unreacted components, low molecular weight components, acid catalyst and reaction solvent.

The method for purifying the reaction mixture, i.e., the crude modified phenolic resin containing the acid catalyst, unreacted components and reaction solvent includes, for example, purification treatment (i) in which the reaction mixture is treated to effect precipitation with a specific solvent to thereby remove solvent-soluble components containing unreacted components, and purification treatment (ii) in which the reaction mixture is dissolved in a specific solvent to thereby extract and remove any catalyst residue.

In the above purification treatment (i), components contained in the petroleum heavy oil or pitch as a raw material, which have low reactivity so as to remain in the reaction mixture in the unreacted or incompletely reacted state, and especially the formaldehyde polymer as a crosslinking agent and the solvent optionally used in the polycondensation reaction, are removed.

This purification treatment (i) may be accomplished by putting the reaction mixture obtained in the polycondensation step, at any time after the production thereof, in a solvent comprising at least one compound selected from the group consisting of aliphatic and alicyclic hydrocarbons each having up to 10 carbon atoms to thereby precipitate the principal component of the resin and remove components soluble in the solvent, i.e., those unreacted and remaining due to incomplete reaction and the solvent used in the polycondensation reaction. Aliphatic and alicyclic hydrocarbons, such as pentane, hexane, heptane and cyclohexane, are used as such a hydrocarbon solvent for purification. n-Hexane is particularly preferred.

In the above purification treatment (ii), the acid catalyst remaining in the reaction mixture and the formaldehyde polymer as a crosslinking agent are removed, thereby producing a modified phenolic resin containing substantially no acid and no crosslinking agent. When the catalyst residue remains in the modified phenolic resin, the amount of acid catalyst added in the molecular weight lowering step must be determined taking the above acid catalyst residue into account, so that the control of reaction conditions becomes difficult.

The above purification treatment (ii) may be accomplished by treating the reaction mixture with an extraction solvent capable of dissolving most of the modified phenolic resin but dissolving the acid catalyst used in the polycondensation of the raw materials in a solubility of 0.1 or less to thereby extract and remove catalyst residue and the formaldehyde polymer as a crosslinking agent.

The extraction solvent is not particularly limited as long as it has the above properties, which may, however, preferably be selected from among aromatic hydrocarbons, such as benzene, toluene and xylene. Of these, toluene is particularly preferred.

In the purification treatment (ii) of the present invention, temperature and other conditions are not particularly limited as long as the above performance of the extraction solvent is fully exhibited. The reaction mixture may be put in the extraction solvent, or alternatively the solvent may be added to the reaction mixture. Thus, the purification treatment (ii) can be accomplished readily and simply.

The modified phenolic resin containing substantially no acid, obtained by the above purification treatment (ii), is generally in the form of a varnish having the resin dissolved in a solvent. The modified phenolic resin in the form of a varnish, if it is a final purified product, may be used as it is for the next step of lowering molecular weight. Alternatively, it may be put in a solvent in which the modified phenolic resin is insoluble, such as n-hexane, to effect precipitation to thereby obtain powder of the modified phenolic resin prior to utilization.

Most of the catalyst residue remaining in the reaction mixture is removed by the purification treatment (ii). If desired, however, the modified phenolic resin obtained by the purification treatment (ii) may be subjected to a neutralization treatment and/or a water washing treatment to thereby effect further removal of the catalyst residue, such as an acid, in the resin.

The neutralization treatment may be performed by adding a basic substance to the modified phenolic resin obtained by the purification treatment (ii). Examples of such basic substances include alkali metal and alkaline earth metal hydroxides, such as sodium, potassium, calcium and magnesium hydroxides, ammonia, diethylenetriamine, triethylenetetramine, aniline and phenylenediamine.

In the purification step employable for the process of the present invention, the purification treatments (i) and (ii) may be carried out in arbitrary sequence. However, because the modified phenolic resin obtained by the purification step (ii) is in the form of a varnish, it is preferred that the varnish be put in a solvent in which the modified phenolic resin is insoluble, for example, n-hexane to thereby recrystallize and harvest powdery modified phenolic resin, from the viewpoint of handling thereof in the molecular weight lowering step.

The case in which the purification treatment (ii) is carried out after the purification treatment (i) is preferred in the viewpoint of the production cost, because the varnish modified phenol resin is used as it is in the next molecular weight lowering step.

In the process for producing the highly reactive low-viscosity modified phenolic resin according to the present invention, the above modified phenolic resin, i.e., the reaction product of the polycondensation step is reacted as it is or after having been purified with the phenols at a temperature higher than 120° C. and not more than 200° C., and preferably between 140° C. and 180° C. in the absence of the formaldehyde polymer and other cross-linking agents and in the presence of the acid catalyst so that the modified phenolic resin has a lowered molecular weight. The reaction temperature of higher than 200° C. is not preferred, because the thermal resistance (Tg) of a molding material using the resultant resin is likely to be deteriorated.

In the molecular weight lowering reaction carried out in such a temperature range, it is considered that the modified phenolic resin is suffered from cleavage and dissociation of methylene bonding in its molecule and the phenols are bonded to dissociation terminals to increase a phenol content of the modified phenolic resin.

There are no limitations to the amount, the type and the combination of the raw material and the acid catalyst, as well as the reaction conditions other than the reaction temperature used in the molecular weight lowering step, as long as it is possible to lower the viscosity of the above mentioned modified phenolic resin and to improve the reactivity thereof with the epoxy resin.

Examples of the phenols used in the molecular weight lowering step include the hydroxybenzene and hydroxynaphthalene compounds described in the polycondensation step.

In the molecular weight lowering step of the process of the present invention, the phenol is employed in an amount of generally at least 100 parts by weight, from 100 to 300 parts by weight, more preferably from 100 to 250 parts by weight, still preferably from 100 to 200 parts by weight, per 100 parts by weight of the modified phenolic resin. When the amount of the phenol is at least 100 parts by weight, the molecular weight lowering reaction is advanced to an extent sufficient for obtaining the desired effect. However, the use of the phenol in excess would result in the remaining of a large amount of unreacted phenol, thereby increasing the cost for posttreatment.

The acid catalyst is added preferably in an amount of 0.1 to 15 parts by weight, still preferably from 0.2 to 10 parts by weight per 100 parts by weight of the modified phenolic resin.

In the molecular weight lowering step, the reaction may be carried out in the absence or presence of a reaction solvent. The reaction solvent is not particularly limited as long as it does not hinder the above molecular weight lowering reaction. For example, the solvents available for the polycondensation and alcohols such as methyl alcohol, ethyl alcohol, buthyl alcohol, hexyl alcohol, heptyl alcohol, octyl alcohol, nonyl alcohol and decyl alcohol may be used in the molecular weight lowering step. The solvent is used preferably in the amount of 0–300 parts by weight relative to 100 parts by weight of the modified phenolic resin.

The reaction temperature is not lower than a certain reaction temperature, typically from 120 to 200° C., and preferably from 140 to 180° C. The reaction time is not limited specifically and may be, for example, from 15 minutes to 2.0 hours, and preferably from 30 minutes to 2.0 hours.

The highly reactive low-viscosity modified phenolic resin obtained as a result of the molecular weight lowering step is lower in (a) number average molecular weight and in (c) resin melt viscosity than the modified phenolic resin obtained by the polycondensation step.

According to the process of the present invention, there is provided a highly reactive modified phenolic resin having the number average molecular weight of from 350 to 650 and the resin melt viscosity measured at 150° C. of from 0.2 to 4.5 poises.

More specifically, the melt viscosity of the highly reactive low-viscosity modified phenolic resin can be lowered considerably when the hydroxybenzene compound is used as the phenols in the molecular weight lowering step. In this event, there is provided a highly reactive low-viscosity modified phenolic resin having the number average molecular weight of from 350 to 450, and particularly from 350 to 400, and the resin melt viscosity measured at 150° C. of from 0.2 to 3.0 poises, and particularly from 0.2 to 2.0 poises.

When the hydroxynaphthalene compound is used as the phenols in the molecular weight lowering step, the resultant highly reactive low-viscosity modified phenolic resin is apt to have a higher melt viscosity than that obtained with the hydroxybenzene compound. However, the thermal resistance and the resistance to the moisture absorption is more improved than the case of using the hydroxybenzene compound. In this event, there is provided a highly reactive modified phenolic resin superior in thermal resistance and resistance to moisture absorption having the number average molecular weight of from 350 to 650, and particular from 350 to 600, and the resin melt viscosity measured at 150° C. of from 1.0 to 4.5 poises, and particularly from 1.0 to 4.0 poises.

The highly reactive low-viscosity modified phenolic resin has a low resin melt viscosity and thus good moldability and is highly reactive with the epoxy resin. Therefore, the highly reactive low-viscosity modified phenolic resin can provide a molding material having a considerably low moisture absorption, as well as good dimensional stability and mechanical properties including strength, when combined with the epoxy resin.

As mentioned above, the present inventors discloses in Japanese Patent Laid-Open Publication No. 7(1995)-252339 a molecular weight lowering step which is carried out at a temperature not higher than 120° C. to cause dissociation of the acetal bonding and/or methylene ether bonding in the resin molecules.

However, the molecular weight lowering step of the present invention is carried out at a higher temperature to allow production of a highly reactive modified phenolic resin having a lower viscosity of from 0.2 to 4.5 poises, which cannot be achieved by the conventional processes. The reason would be that the molecular weight lowering step carried out at the higher temperature causes cleavage and dissociation of regions or sites other than the acetal bonding and/or methylene ether bonding, i.e., cleavage and dissociation of methylene bonding in the modified phenolic resin molecules.

It was revealed that the highly reactive low-viscosity modified phenolic resin obtained according to the process of the present invention exhibits a considerably low moisture absorption when used as a molding material in combination with the epoxy resin as described later. Such molding materials are advantageously employed for articles in which corrosion of metal portions and deterioration of the dimensional stability are undesirable. In addition, it is expected that the thermal resistance and the resistance to moisture absorption of the molding material is further improved by means of producing the highly reactive low-viscosity modified phenolic resin with using the hydroxynaphthalene compound in the molecular weight lowering step.

The highly reactive low-viscosity modified phenolic resin obtained by such molecular weight lowering step may be used as it is for various applications. However, there is a possibility of the unreacted components and the acid catalyst remained in the resin. Accordingly, it is preferable to remove the unreacted components and the acid catalysts in a similar manner by using the solvent described in the purification (i) and (ii) of the modified phenolic resin or by means of purification with a different solvent. Examples of the solvent suitably used for the purification of the highly reactive low-viscosity modified phenolic resin include toluene; mixed solvents of toluene and alcohols such as ethyl alcohol and methyl alcohol; and mixed solvents of toluene and ketone such as acetone, tetrahydrofurane, methyl ethyl ketone, and methyl isobutyl ketone.

It is preferred that the highly reactive low-viscosity modified phenolic resin be subjected to a washing treatment using a mixed solution of distilled water and isopropyl alcohol, if necessary, after the unreacted components such as phenols and the acid catalyst are extracted by using the above mentioned solvent.

If there still remains the unreacted phenols after such treatment, they may be removed by means of distillation with water vapor. The unreacted phenols may also be removed by means of introducing nitrogen under heat instead of the vapor distillation. These methods may be carried out in combination.

It is also preferred that the highly reactive low-viscosity modified phenolic resin be desolvated or precipitated with an aliphatic or alicyclic hydrocarbon having up to 10 carbon atoms, or a mixture thereof, after the unreacted components and the acid catalyst are removed therefrom. The hydrocarbon solvent includes the solvent described in the purification (i) for the modified phenolic resin. Among them, n-hexane is particularly preferable.

The purification as described above removes the acid catalyst, unreacted materials and reaction solvent remaining in the resin to thereby provide a highly reactive modified phenolic resin which contains substantially no acid, thereby exhibiting no corrosive action to metals and which is improved in the reactivity to an epoxy resins, thereby having improved thermal resistance and dimensional stability. The terminology "containing substantially no acid" used herein means that either an acid or the like is completely absent, or an extremely small amount thereof remains which however does not exhibit any significant corrosive action to metals.

The molding material based on the modified phenolic resin according to the present invention comprises (B) an epoxy resin together with (A) the highly reactive low-viscosity modified phenolic resin which is obtained by the process of the present invention and has the resin melt viscosity of from 0.2 to 4.5 poises, and particularly from 0.2 to 3.0 poises or from 1.0 to 4.5 poises. In the molding material based on the modified phenolic resin according to the present invention, the highly reactive low-viscosity modified phenolic resin (A) may be composed of a resin, or at least two resins, for example, the highly reactive low-viscosity modified phenolic resins made by using the hydroxybenzene compound in the molecular weight lowering step and made by using the hydroxynaphthalene compound in the molecular weight lowering step.

The epoxy resin generally exhibits less molding shrinkage, excellent thermal, abrasion and chemical resistance, and high electrical insulating property. The epoxy resin may optionally be employed in combination with a curing agent and/or curing accelerator (C).

Various epoxy resins are available, which include, for example, glycidyl ether, glycidyl ester, glycidylamine, mixed and alicyclic epoxy resins.

In particular, examples of the glycidyl ether (based on phenol) epoxy resins include bisphenol A, biphenyl, bisphenol F, tetrabromobisphenol A, tetraphenylolethane, phenolic novolak and o-cresol novolak epoxy resins.

Examples of the glycidyl ether (based on alcohol) epoxy resins include polypropylene glycol and hydrogenated bisphenol A epoxy resins.

Examples of the glycidyl ester epoxy resins include hexahydrophthalic anhydride and dimer acid epoxy resins.

Examples of the glycidylamine epoxy resins include diaminodiphenylmethane, isocyanuric acid and hydantoinic acid epoxy resins.

Examples of the mixed epoxy resins include p-aminophenol and p-oxybenzoic acid epoxy resins. Of the above epoxy resins, bisphenol A, biphenyl, glycidylamine and phenolic novolak epoxy resins are preferred. The above epoxy resins may also be used in combination.

With respect to the ratio at which the highly reactive modified phenolic resin of the present invention is blended with the epoxy resin, it is generally preferred that the modified phenolic resin be blended with the epoxy resin at a ratio of 10/90 to 90/10 (parts by weight), especially 20/80 to 80/20 (parts by weight).

Various conventional curing agents and accelerators used for curing epoxy resins can be employed as a curing agent and/or accelerator (C) to be incorporated in the molding material based on the modified phenolic resin according to the present invention. Examples of such curing agents include cyclic amines, aliphatic amines, polyamides, aromatic polyamines and acid anhydrides.

In particular, examples of suitable cyclic amines include hexamethylenetetramine, and examples of suitable aliphatic amines include diethylenetriamine, triethylenetetramine, tetraethylenepentamine, diethylaminopropylamine, N-aminoethylpiperamine, isophoronediamine, bis(4-amino-3-methylcyclohexyl)methane and menthanediamine.

Examples of the polyamides include condensates of a fatty acid from vegetable oil (dimer or trimer acid) and an aliphatic polyamine.

Examples of the aromatic polyamines include m-phenylenediamine, 4,4'-diaminodiphenylmethane, 4,4'-diaminodiphenyl sulfone and m-xylylenediamine.

Examples of the acid anhydrides include phthalic anhydride, tetrahydrophthalic anhydride, hexahydrophthalic anhydride, trimellitic anhydride, pyromellitic anhydride, benzophenonetetracarboxylic anhydride, chlorendic anhydride, dodecenylsuccinic anhydride, methyltetrahydrophthalic anhydride and methylendomethylenetetrahydrophthalic anhydride.

Examples of the curing accelerators include diazabicycloalkenes such as 1,8-diazabicyclo(5,4,0)undecene-7 and derivatives thereof; tertiary amines such as triethylenediamine, benzyldimethylamine, triethanolamine, dimethylaminoethanol and tris(dimethylaminomethyl) phenol; imidazoles such as 2-methylimidazole, 2-ethyl-4-methylimidazole, 2-phenylimidazole, 2-phenyl-4-methylimidazole and 2-heptadecylimidazole; organophosphines such as tributylphosphine, methyldiphenylphosphine and triphenylphosphine; tetrasubstituted-phosphonium tetra-substituted-borates such as tetraphenylphosphonium tetraphenylborate; tetraphenylborates such as 2-ethyl-4-methylimidazolyl tetraphenylborate and N-methylmorpholinyl tetraphenylborate; Lewis acids such as boron trifluoride/amine complex; Lewis bases such as dicyanodiamide and adipodihydrazide; and polymercaptans and polysulfides. The above curing agents and curing accelerators may be employed either individually or in combination.

The molding material based on (A) the highly reactive low-viscosity modified phenolic resin and (B) the epoxy resin exhibits a low moisture absorption. This moisture absorption is lower than those of the conventional highly reactive modified phenolic resins. Such molding materials may advantageously be used for articles such as the electrical and electronic parts as well as the semiconductor sealers where corrosion of metal portions and deterioration of the dimensional stability are undesirable.

The molding material based on the modified phenolic resin according to the present invention may comprise an inorganic filler (D), in addition to the highly reactive modified phenolic resin (A), the epoxy resin (B) and the optionally added curing agent and/or curing accelerator (C).

The strength and dimensional stability of the obtained molding can further be improved by the addition of the inorganic filler (D) to the molding material.

Various conventional inorganic fillers having been used as an inorganic filler or reinforcement for plastic materials may be used as the inorganic filler (D) in the present invention. Examples of such inorganic fillers include reinforcing fibers, such as glass, carbon, phosphor and boron fibers; hydrated metal oxides, such as aluminum and magnesium hydroxides; metal carbonates, such as magnesium and calcium carbonates; metal borates, such as magnesium borate; and inorganic reinforcements, such as silica, mica and fused silica.

The amount of added inorganic filler (D) is not particularly limited. However, it is preferred that 20 to 800 parts by weight, especially 50 to 600 parts by weight of the inorganic filler be added per 100 parts by weight of the highly reactive modified phenolic resin.

Moreover, if desired, the molding material based on the modified phenolic resin according to the present invention may further comprise additives, including internal release agents, such as silicone and waxes, coupling agents, flame retarders, light stabilizers, antioxidants, pigments and extenders.

The molding material based on the modified phenolic resin according to the present invention as described above is prepared by mixing together the highly reactive low-viscosity modified phenolic resin (A) and the epoxy resin (B), optionally together with the curing agent and/or curing accelerator (C), the inorganic filler (D) and various additives, and used for forming various moldings.

In the present invention, the sequence in which the highly reactive low-viscosity modified phenolic resin (A), the epoxy resin (B) and optionally added components such as the curing agent (C) are blended, is not particularly limited. For example, a powdery molding compound may be obtained by first blending a highly reactive modified phenolic resin with an epoxy resin, secondly adding a curing agent (curing accelerator) to the blend, followed by effective kneading, and finally, if desired, adding an inorganic filler and additives, followed by kneading.

In particular, the above compound may be produced by the following sequence of operations:

(1) blending a highly reactive low-viscosity modified phenolic resin with an epoxy resin in an automatic mortar at room temperature;

(2) adding to the resultant blend other additives such as a curing agent and wax, followed by blending;

(3) adding to the resultant blend an inorganic filler, followed by blending; and (4) further effecting blending by means of rolls heated at 80 to 90° C. for 3 to 10 min, cooling to room temperature and pulverizing to thereby obtain the desired compound.

In this sequence of operations, the additions of the inorganic filler and the other additives are separately carried out after the blending of the highly reactive low-viscosity modified phenolic resin and the epoxy resin. This is not critical, and the additions of the additives may be conducted at an arbitrary time.

The molding material based on the highly reactive modified phenolic resin according to the present invention can be molded by various conventional molding means, including, for example, compression, injection, extrusion, transfer and casting molding techniques.

In particular, when the molding material based on modified phenolic resin according to the present invention is formed into a molding by transfer molding technique, such molding conditions are preferably selected that the molding temperature is in the range of from 120 to 200° C., the injection pressure is in the range of from 5 to 300 Kgf/cm², especially 20 to 300 Kgf/cm², the clamp pressure is in the range of from 50 to 250 Kgf/cm² and the molding time is in the range of from 1 to 10 min.

The resultant molding is preferably subjected to a postcure comprising heating at 150 to 300° C. for 0.5 to 24 hr.

The postcure further improves the thermal resistance of the molding.

The molding obtained from the molding material based on the modified phenolic resin according to the present invention is excellent in resistances to moisture and high temperature, as well as electrical insulation properties and mechanical strength, and has, for example, the following properties:

| | | |
|---|---|---|
| Flexural strength | room temperature | 8–22 kgf/mm² |
| | 150° C. | 3–14 kgf/mm² |
| Flexural modulus | room temperature | 400–2000 kgf/mm² |
| | 150° C. | 40–1500 kgf/mm² |
| Glass transition temperature (° C.) | | 120–260° C. |
| Thermal deformation temperature | higher | 190–300° C. or |
| Insulation resistance | ordinary state | $1.8 \times 10^{14}$– $5.0 \times 10^{14}$ Ω |
| | after boiling | $3.0 \times 10^{13}$– $2.0 \times 10^{14}$ Ω |

The molding material based on the modified phenolic resin according to the present invention has the improved reactivity of the modified phenolic resin with the epoxy resin, so that the molded articles produced therefrom have improved mechanical properties including the dimensional stability and the thermal stability. The highly reactive low-viscosity modified phenolic resin used has a low viscosity and thus good moldability, and significantly low moisture absorption. In the molding material based on the modified phenolic resin according to the present invention, the possible corrosive effect on the metals can be reduced or eliminated by using the modified phenolic resin containing substantially no acid. By adding the inorganic filler, it is possible to further improve the mechanical strength and the electrical insulation properties of the resultant molded articles.

Accordingly, the molded article made of the material based on the modified phenolic resin is useful as materials of the electrical and electronic parts and components such as printed boards, insulating materials, and sealants, where the moisture absorption is undesirable and on which stringent requirements are imposed regarding the dimensional stability, the thermal resistance, and the moldability. In addition, it is particularly useful as the semiconductor sealers on which improvements of thermal resistance, dimensional stability to cope with stress damaging attributed to a higher degree of integration, and moisture absorption are demanded.

EFFECT OF THE INVENTION

According to the process for producing the highly reactive low-viscosity modified phenolic resin of the present invention, the modified phenolic resin is produced by the above mentioned polycondensation and molecular weight lowering steps, so that there is provided a highly reactive low-viscosity modified phenolic resin having a high reactivity with the epoxy resin and an especially lower resin melt viscosity.

The process of the present invention can further lower the melt viscosity of the highly reactive low-viscosity modified phenolic resin by using the hydroxybenzene compound as the phenols in the molecular weight lowering step. In addition, the thermal resistance and resistance to moisture absorption of the resultant highly reactive low-viscosity modified phenolic resin can be further improved by using the hydroxynaphthalene compound as the phenols in the molecular weight lowering step.

Furthermore, according to the process for producing the highly reactive low-viscosity modified phenolic resin of the present invention, the highly reactive low-viscosity modified phenolic resin obtained in the molecular weight reduction step is purified to remove any unreacted components and acid catalyst to provide the highly reactive low-viscosity modified phenolic resin having significantly low resin melt viscosity and high reactivity with the epoxy resin, as well as having no corrosive effect on metals because it contains substantially no acid.

The molding material based on the modified phenolic resin of the present invention comprises the highly reactive low-viscosity modified phenolic resin obtained by the process of the present invention and the epoxy resin, and has considerably low moisture absorption and good thermal resistance and moldability, with which it is possible to provide a molding material for the molding articles having superior mechanical properties including the dimensional stability, in particular, especially to provide the electrical and electronic parts and the semiconductor sealers.

EXAMPLE

The present invention will further be illustrated with reference to the following Examples, which should not be construed as limiting the scope of the invention.

In the following Examples, the parts are by weight, unless otherwise specified. The characteristics of stock oil as a raw material for polycondensation are indicated in Table 1. The stock oil is one obtained by distilling bottom oil produced by fluid catalytic cracking (FCC) of vacuum gas oil.

TABLE 1

| | |
|---|---|
| Average Molecular Weight | 271 |
| Boiling Point (° C.) | 241.5–466.5 |
| Ratio of Aromatic Hydrocarbon (fa) | 0.65 |

TABLE 1-continued

| | |
|---|---|
| Ratio of Hydrogen of Aromatic Ring (Ha) (%) | 28 |

Note:
(1) Average molecular weight: value measured according to the vapor pressure osmometry.
(2) Boiling point: value of ° C. in terms of the atmospheric pressure, measured according to ASTM D-1160.

In the following examples, the number average molecular weight, the reactivity with an epoxy resin (determined on the basis of gelation time; the shorter gelation time means the higher reactivity), and the resin melt viscosity were measured by using the following apparatus or measuring methods.

Number Average Molecular Weight

Measured by using HLC-8020 GPC apparatus (Column; TSK gel 3000 HHR+TSK gel 2000 HHR, calculated using polystyrene as a standard substance: Manufactured by TOSOH Co., Ltd. )

Viscosity Measurement

Measured by the ICI cone plate viscometer manufactured by ICI Co.

Gelation Time

Measured at 170° C. in accordance with Japanese Industrial Standard (JIS) K 6910.

Glass Transition Temperature

Method: dynamic modulus of viscoelasticity

Apparatus: DVE RHEOSPECTOLER DVE-4V manufactured by Rheorogy Co.

Loading: tensile loading

Frequency: 10 Hz

Rate of temperature increase: 5° C./min.

Dynamic measurement displacement: $\pm 5+10^{-4}$ cm

Test piece: 4 mm in width, 1 mm in thickness, and 30 mm in span

OH Equivalent

Measured according to acetyl chloride method

Example 1

Polycondensation Step 334 g of stock oil having the characteristics shown in Table 1, 370 g of paraformaldehyde, 137 g of p-toluenesulfonic acid monohydrate and 678.5 g of p-xylene were charged into a glass reactor, and the temperature thereof was elevated to 95° C. under agitation. The mixture was held at 95° C. for 1 hour. Subsequently, 209 g of phenol was added dropwise to the mixture at a rate of 1.3 g/min. After completion of the dropwise addition of phenol, agitation was continued for additional 15 minutes to effect reaction. Next, the reaction mixture was poured into 3,300 g of n-hexane to precipitate a reaction product. The precipitate was then filtered to remove unreacted components and reaction solvent. The resultant precipitate was washed with 1,600 g of n-hexane and dried in vacuum to obtain a crude modified phenolic resin containing an acid.

This modified phenolic resin was dissolved into a 10-fold weight of toluene. Insoluble substances mainly composed of p-toluenesulfonic acid monohydrate was filtered off. The resultant toluene solution of the resin was concentrated to a resin concentration of 50% by weight to obtain a modified phenolic resin in the form of vanish. Furthermore, a small amount of triethylenetetramine was added thereto for neutralization. The resultant modified phenolic resin in the form of vanish was poured into a 3.3-fold weight of n-hexane to precipitate the resin. The precipitated resin was filtered and dried in vacuum to obtain 580 g of powdery modified phenolic resin.

Molecular Weight Lowering Step 100 g of the resultant powdery modified phenolic resin, 200 g of phenol, and 5 g of p-toluenesulfonic acid were charged into a 1-liter glass reactor. The mixture was heated to the temperature of 120° C. while stirring at a rate of 250–350 rpm. The mixture was allowed to react at 120° C. for 90 minutes to obtain a reaction product. The resultant reaction product was poured into 400 ml of mixed solution of toluene/methyl isobutyl ketone (mixing ratio of 7/3) and dissolved therein. The resultant resin mixed solution was washed with distilled water to remove the acid, and the mixed solvent was then removed by using an evaporator to obtain 182 g of a highly reactive low-viscosity modified phenolic resin.

The number average molecular weight, the viscosity at 150° C., and the hydroxyl equivalent were measured on the resultant highly reactive low-viscosity modified phenolic resin. The results are shown in Table 2 along with reaction conditions in the molecular weight lowering step including the reaction temperature.

Examples 2–6

Example 1 was repeated except that the reaction conditions for the molecular weight lowering step were changed as shown in Table 2 to obtain a highly reactive low-viscosity modified phenolic resin in the yields shown in Table 2.

The number average molecular weight, the viscosity at 150° C., and the hydroxyl equivalent were measured on the resultant highly reactive low-viscosity modified phenolic resin. The results are shown in Table 2.

Example 7

100 g of powdery modified phenolic resin obtained in the polycondensation step in Example 1, 200 g of o-cresol, and 5 g of p-toluenesulfonic acid were charged into a 1-liter glass reactor. The mixture was heated to the temperature of 140° C. while stirring at a rate of 250–350 rpm. The mixture was allowed to react at 140° C. for 90 minutes to obtain a reaction product.

The resultant reaction product was introduced into 400 ml of mixed solution of toluene/methyl isobutyl ketone (mixing ratio of 7/3) and dissolved therein. The resultant resin mixed solution was washed with distilled water to remove the acid, and the mixed solvent was then removed by using an evaporator to obtain 192 g of a highly reactive low-viscosity modified phenolic resin based on o-cresol.

The number average molecular weight, the viscosity at 150° C., and the hydroxyl equivalent were measured on the resultant highly reactive low-viscosity modified phenolic resin. The results are shown in Table 2.

Example 8

Example 7 was repeated except that the reaction conditions for the molecular weight lowering step were changed as shown in Table 2 to obtain a highly reactive low-viscosity modified phenolic resin in the yields shown in Table 2.

The number average molecular weight, the viscosity at 150° C., and the hydroxyl equivalent were measured on the resultant highly reactive low-viscosity modified phenolic resin. The results are shown in Table 2.

Example 9

Example 7 was repeated except that m-cresol was used in place of o-cresol as the hydroxybenzene compound in the molecular weight lowering step to obtain a highly reactive low-viscosity modified phenolic resin based on m-cresol in the yields shown in Table 2.

The number average molecular weight, the viscosity at 150° C., and the hydroxyl equivalent were measured on the resultant highly reactive low-viscosity modified phenolic resin. The results are shown in Table 2.

Example 10

200 g of modified phenolic resin in the form of vanish (resin concentration of 50%) obtained in the polycondensation step in Example 1, 200 g of phenol, and 5 g of p-toluenesulfonic acid were charged into a 1-liter glass reactor. The mixture was heated to the temperature of 160° C. while stirring at a rate of 250–350 rpm. The mixture was allowed to react at 160° C. for 90 minutes to obtain a reaction product.

The resultant reaction product was introduced into 400 ml of mixed solution of toluene/methyl isobutyl ketone (mixing ratio of 7/3) and dissolved therein. The resultant resin-mixed solution was washed with distilled water to remove the acid, and the mixed solvent was then removed by using an evaporator to obtain 200 g of a highly reactive low-viscosity modified phenolic resin.

The number average molecular weight, the viscosity at 150° C., and the hydroxyl equivalent were measured on the resultant highly reactive low-viscosity modified phenolic resin. The results are shown in Table 2.

Comparative Example 1

100 g of powdery modified phenolic resin obtained in the polycondensation step in Example 1, 200 g of phenol, and 5 g of p-toluenesulfonic acid were charged into a 1-liter glass reactor. The mixture was heated to the temperature to 95° C. while stirring at a rate of 250–350 rpm. The mixture was allowed to react at 95° C. for 90 minutes to obtain a reaction product.

The resultant reaction product was introduced into 400 ml of mixed solution of toluene/methyl isobutyl ketone (mixing ratio of 7/3) and dissolved therein. The resultant resin-mixed solution was washed with distilled water to remove the acid, and the mixed solvent was then removed by using an evaporator to obtain 175 g of resultant modified phenolic resin.

The number average molecular weight, the viscosity at 150° C., and the hydroxyl equivalent were measured on the resultant modified phenolic resin. The results are shown in Table 2.

Example 11

9.17 parts by weight of highly reactive low-viscosity modified phenolic resin obtained in Example 3 and 14.89 parts by weight of biphenyl epoxy resin (trade name; YX4000H, produced by Yuka Shell Epoxy Co., Ltd.) were mixed and agitated by using an automatic mortar at a room temperature. Then, 0.49 parts by weight of triphenylphosphine (TPP) was added to the mixture as a curing accelerator to obtain a resin mixture containing a curing accelerator-containing resin mixture.

The gelation time of the curing accelerator-containing resin mixture was measured and is shown in Table 3.

0.25 parts by weight of carnauba wax was added to and mixed with the resultant curing accelerator-containing resin mixture. Then, 0.20 parts by weight of carbon black and 75 parts by weight of fused silica (trade name; CRS1102-GT200T, produced by Tatsumori Co., Ltd.) as inorganic fillers were added to and mixed with the mixture. The resultant mixture was mixed for additional 3–10 minutes by using rolls heated at 80–90° C. and was then cooled to a room temperature. The resultant mixture was then pulverized to obtain a compound. The formulation of this compound is shown in Table 3.

The resultant compound was subjected to transfer molding conducted at 175° C. for 90 seconds and was postcured at 175° C. for additional 6 hours to obtain a molded article.

The Shore hardness, the glass transition temperature, the flexural properties, and the moisture absorption were measured on the resultant molded article just after the molding. The results are shown in Table 3.

Examples 12–17

Example 11 was repeated except that the highly reactive low-viscosity modified phenolic resin obtained in Example 3 was replaced with the highly reactive low-viscosity modified phenolic resin obtained in each of Examples 4–10, and that the modified phenolic resin and the epoxy resin were blended in the ratio shown in Table 3 to obtain a curing accelerator-containing resin mixture, a compound, and a molded article.

The gelation time of the curing acceleration-containing resin mixture of the curing acceleration-containing mixture and the physical properties (the Shore hardness, the glass transition temperature, the flexural properties, and the moisture absorption just after the molding of the molded article) of the molded article were measured on the resultant molded article. The results are shown in Table 3.

Comparative Example 2

Example 11 was repeated except that the highly reactive low-viscosity modified phenolic resin obtained in Example 3 was replaced with the modified phenolic resin obtained in Comparative Example 1 to obtain a curing accelerator-containing resin mixture, a compound, and a molded article.

The gelation time of the curing acceleration-containing resin mixture and the physical properties (the Shore hardness, the glass transition temperature, the flexural Properties, and the moisture absorption just after the molding) of the molded article were measured. The results are shown in Table 3.

Example 18

9.39 parts by weight of highly reactive low-viscosity modified phenolic resin obtained in Example 1 and 14.91 parts by weight of o-cresol novolak epoxy resin (trade name; EOCN1020, produced by Nippon Kayaku Kabushiki Kaisha) were mixed and agitated by using an automatic mortar at a room temperature. Then, 0.25 parts by weight of triphenylphosphine (TPP) was added to the mixture as a curing accelerator to obtain a curing accelerator-containing resin mixture.

The gelation time of the curing accelerator-containing resin mixture was measured and is shown in Table 4.

0.25 parts by weight of carnauba wax was added to and mixed with the resultant curing accelerator-containing resin mixture. Then, 0.20 parts by weight of carbon black and 75 parts by weight of fused silica (trade name; CRS1102-GT200T, produced by Tatsumori Co., Ltd.) as inorganic fillers were added to and mixed with the mixture. The resultant mixture was mixed for additional 3–10 minutes by using rolls heated at 80–90° C. and was then cooled to a room temperature. The resultant mixture was then pulverized to obtain a compound. The formulation of this compound is shown in Table 4.

The resultant compound was subjected to transfer molding conducted at 175° C. for 90 seconds and was postcured at 175° C. for additional 6 hours to obtain a molded article.

The Shore hardness, the glass transition temperature, the flexural properties, and the moisture absorption were measured on the resultant molded article just after the molding. The results are shown in Table 4.

Examples 19–23

Example 18 was repeated except that the highly reactive low-viscosity modified phenolic resin obtained in Example 1 was replaced with the highly reactive low-viscosity modified phenolic resin obtained in each of Examples 2–10, and that the modified phenolic resin and the epoxy resin were blended in the ratio shown in Table 4 to obtain a curing accelerator-containing resin mixture, a compound, and a molded article.

The gelation time of the curing accelerator-containing resin mixture and the physical properties (the Shore hardness, the glass transition temperature, the flexural properties, and the moisture absorption just after the molding) of the molded article were measured. The results are shown in Table 4.

Comparative Example 3

Example 18 was repeated except that the highly reactive low-viscosity modified phenolic resin obtained in Example 1 was replaced with the modified phenolic resin obtained in Comparative Example 1 to obtain a curing accelerator-containing resin mixture, a compound, and a molded article.

The gelation time of the curing accelerator-containing resin mixture and the physical properties (the Shore hardness, the glass transition temperature, the flexural properties, and the moisture absorption just after the molding) of the molded article were measured. The results are shown in Table 4.

Example 24

Molecular Weight Lowering Step 100 g of powdery modified phenolic resin obtained in the polycondensation step in Example 1 and 250 g of α-naphthol were charged into a 1-liter glass reactor. The mixture was heated to the temperature of 120° C. while stirring at a rate of 250–350 rpm. 5 g of p-toluenesulfonic acid dissolved in 5 g of 1-butanol was added dropwise to the mixture and the mixture was allowed to react at 120° C. for 120 minutes to obtain a reaction product.

The resultant reaction product was introduced into 800 ml of methyl isobutyl ketone and dissolved therein. The resultant resin mixed solution was washed with distilled water to remove the acid, and the solvent was then removed by using an evaporator.

The resultant crude highly reactive modified phenolic resin was distilled by water vapor at 160–170° C. and unreacted α-naphthol was removed therefrom by means of introducing nitrogen at the same temperature to obtain 230 g of highly reactive low-viscosity modified phenolic resin.

The number average molecular weight, the viscosity at 150° C., and the hydroxyl equivalent were measured on the resultant highly reactive low-viscosity modified phenolic resin. The results are shown in Table 5 along with reaction conditions for the molecular weight lowering step including the reaction temperature.

Examples 25–27

Example 24 was repeated except that the reaction conditions for the molecular weight lowering step were changed as shown in Table 5 to obtain a highly reactive low-viscosity modified phenolic resin in the yields shown in Table 5.

The number average molecular weight, the viscosity at 150° C., and the hydroxyl equivalent were measured on the resultant highly reactive low-viscosity modified phenolic resin. The results are shown in Table 5.

Example 28

100 g of powdery modified phenolic resin obtained in the polycondensation step in Example 1, 101 g of α-naphthol, 132 g of phenol, and 5 g of p-toluenesulfonic acid were charged into a 1-liter glass reactor. The mixture was heated to the temperature of 160° C. while stirring at a rate of 250–350 rpm. The mixture was allowed to react at 160° C. for 60 minutes to obtain a reaction product.

The resultant reaction product was introduced into 800 ml of mixed solution of toluene/methyl isobutyl ketone (mixing ratio of 7/3) and dissolved therein. The resultant resin-mixed solution was washed with distilled water to extract and remove the acid, and the mixed solvent was then removed by using an evaporator. The resultant crude highly reactive modified phenolic resin was distilled by water vapor at 160–170° C. and unreacted α-naphthol and phenol were removed therefrom by means of introducing nitrogen at the same temperature to obtain 220 g of highly reactive low-viscosity modified phenolic resin.

The number average molecular weight, the viscosity at 150° C., and the hydroxyl equivalent were measured on the resultant naphthol highly reactive low-viscosity modified phenolic resin. The results are shown in Table 5.

Example 29

100 g of powdery modified phenolic resin obtained in the polycondensation step in Example 1 and 200 g of β-naphthol were charged into a 1-liter glass reactor. The mixture was heated to the temperature of 140° C. while stirring at a rate of 250–350 rpm. 5 g of p-toluenesulfonic acid dissolved in 1-butanol was added dropwise to the mixture and the mixture was allowed to react at 140° C. for 120 minutes to obtain a reaction product.

The resultant reaction product was introduced into 800 ml of methyl isobutyl ketone and dissolved therein. The resultant resin mixed solution was washed with distilled water to extract and remove the acid, and the solvent was then removed by using an evaporator.

The resultant crude highly reactive modified phenolic resin was distilled by water vapor at 160–170° C. and unreacted β-naphthol was removed therefrom by means of introducing nitrogen at the same temperature to obtain 220 g of highly reactive low-viscosity modified phenolic resin.

The number average molecular weight, the viscosity at 150° C., and the hydroxyl equivalent were measured on the resultant highly reactive low-viscosity modified phenolic resin. The results are shown in Table 5.

Example 30

200 g of modified phenolic resin in the form of vanish (resin concentration of 50%) obtained in the polycondensation step in Example 1 and 250 g of α-naphthol were charged into a 1-liter glass reactor. The mixture was heated to the temperature of 120° C. while stirring at a rate of 250–350 rpm. 5 g of p-toluenesulfonic acid dissolved in 5 g of 1-butanol was added dropwise to the mixture and the mixture was allowed to react at 120° C. for 120 minutes to obtain a reaction product.

The resultant reaction product was introduced into 800 ml of methyl isobutyl ketone and dissolved therein. The resultant resin-mixed solution was washed with distilled water to extract and remove the acid, and the solvent was then removed by using an evaporator.

The resultant crude highly reactive modified phenolic resin was distilled by water vapor at 160–170° C. and unreacted α-naphthol was removed therefrom by means of introducing nitrogen at the same temperature to obtain 230 g of highly reactive low-viscosity modified phenolic resin.

The number average molecular weight and the viscosity at 150° C., and the hydroxyl equivalent were measured on the resultant highly reactive low-viscosity modified phenolic resin. The results are shown in Table 5.

Example 31

11.71 parts by weight of highly reactive low-viscosity modified phenolic resin obtained in Example 24 and 12.35 parts by weight of biphenyl epoxy resin (trade name; YX4000H, produced by Yuka Shell Epoxy Co., Ltd.) were mixed and agitated by using an automatic mortar at a room temperature. Then, 0.49 parts by weight of triphenylphosphine (TPP) was added to the mixture as a curing accelerator to obtain a curing accelerator containing resin mixture.

The gelation time of the curing accelerator-containing resin mixture was measured and is shown in Table 6.

0.25 parts by weight of carnauba wax was added to and mixed with the resultant curing accelerator-containing resin mixture. Then, 0.20 parts by weight of carbon black and 75 parts by weight of fused silica (trade name; CRS1102-GT200T, produced by Tatsumori Co., Ltd.) as inorganic fillers were added to and mixed with the mixture. The resultant mixture was mixed for additional 3–10 minutes by using rolls heated at 80–90° C. and was then cooled to a room temperature. The resultant mixture was then pulverized to obtain a compound. The formulation of this compound is shown in Table 6.

The resultant compound was subjected to transfer molding conducted at 175° C. for 90 seconds and was postcured at 175° C. for additional 6 hours to obtain a molded article.

The Shore hardness, the glass transition temperature, the flexural properties, and the moisture absorption were measured on the resultant molded article just after the molding. The results are shown in Table 6.

Examples 32–37

Example 31 was repeated except that the highly reactive low-viscosity modified phenolic resin obtained in Example 24 was replaced with the highly reactive low-viscosity modified phenolic resin obtained in each of Examples 25–30, and that the modified phenolic resin and the epoxy resin were blended in the ratio shown in Table 6 to obtain a curing accelerator-containing resin mixture, a compound, and a molded article.

The gelation time of the curing accelerator-containing resin mixture and the physical properties (the Shore hardness, the glass transition temperature, the flexural properties, and the moisture absorption just after the molding) of the molded article were measured. The results are shown in Table 6.

Example 38

Example 31 was repeated except that the highly reactive low-viscosity modified phenolic resin obtained in Example 24 was used together with the highly reactive low-viscosity modified phenolic resin obtained in Example 4 which were mixed with each other in a ratio given in Table 6, and that the modified phenolic resin mixture and the epoxy resin were blended in the ratio shown in Table 6 to obtain a curing accelerator-containing resin mixture, a compound, and a molded article.

The gelation time of the curing accelerator-containing resin mixture and the physical properties (the Shore hardness, the glass transition temperature, the flexural properties, and the moisture absorption just after the molding) of the molded article were measured. The results are shown in Table 6.

Example 39

11.76 parts by weight of highly reactive low-viscosity modified phenolic resin obtained in Example 24 and 12.54 parts by weight of o-cresol novolak epoxy resin (trade name; EOCN1020, produced by Nippon Kayaku Kabushiki Kaisha) were mixed and agitated by using an automatic mortar at a room temperature. Then, 0.25 parts by weight of triphenylphosphine (TPP) was added to the mixture as a curing accelerator to obtain a curing accelerator-containing resin mixture.

The gelation time of the curing accelerator-containing resin mixture was measured and is shown in Table 7.

0.25 parts by weight of carnauba wax was added to and mixed with the resultant curing accelerator-containing resin mixture. Then, 0.20 parts by weight of carbon black and 75 parts by weight of fused silica (trade name; CRS1102-GT200T, produced by Tatsumori Co., Ltd.) as inorganic fillers were added to and mixed with the mixture. The resultant mixture was mixed for additional 3–10 minutes by using rolls heated at 80–90° C. and was then cooled to a room temperature. The resultant mixture was then pulverized to obtain a compound. The formulation of this compound is shown in Table 7.

The resultant compound was subjected to transfer molding conducted at 175° C. for 90 seconds and was postcured at 175° C. for additional 6 hours to obtain a molded article.

The Shore hardness, the glass transition temperature, flexural properties, and the moisture absorption were measured on the resultant molded article just after the molding. The results are shown in Table 7.

Examples 40–45

Example 39 was repeated except that the highly reactive low-viscosity modified phenolic resin obtained in Example 24 was replaced with the highly reactive low-viscosity modified phenolic resins obtained in each of Examples 25–30, and that the modified phenolic resin and the epoxy resin were blended in the ratio shown in Table 7 to obtain a curing accelerator-containing resin mixture, a compound, and a molded article.

The gelation time of the curing accelerator-containing resin mixture and the physical properties (the Shore hardness, the glass transition temperature, the flexural properties, and the moisture absorption just after the molding) of the molded article were measured. The results are shown in Table 7.

TABLE 2-1

|  |  | Example 1 | Example 2 | Example 3 | Example 4 |
|---|---|---|---|---|---|
| Amount of Powdery modified phenolic resin | (g) | 100 | 100 | 100 | 100 |
| Amount of Vanish modified phenolic resin | (g) | — | — | — | — |
| Amount of Phenol | (g) | 200 | 150 | 200 | 200 |
| Amount of o-cresol | (g) | — | — | — | — |
| Amount of m-cresol | (g) | — | — | — | — |
| Amount of Acid catalyst (PTS) | (g) | 5 | 5 | 5 | 5 |
| Reaction temperature | (° C.) | 120 | 140 | 140 | 160 |
| Reaction time | (min.) | 120 | 120 | 120 | 120 |
| Solvent for dilution | — | toluene/MIBK | toluene/MIBK | toluene/MIBK | toluene/MIBK |
| Amount of Reaction product | (g) | 182 | 195 | 195 | 197 |
| Viscosity at 150° C. (ICI viscomener) | (p) | 3.0 | 2.0 | 1.2 | 0.6 |
| Number average molecular weight (GPC) | — | 490 | 470 | 400 | 430 |
| OH equivalent | — | 124 | 120 | 120 | 123 |

TABLE 2-2

|  |  | Example 5 | Example 6 | Example 7 | Example 8 |
|---|---|---|---|---|---|
| Amount of Powdery modified phenolic resin | (g) | 100 | 100 | 100 | 100 |
| Amount of Vanish modified phenolic resin | (g) | — | — | — | — |
| Amount of Phenol | (g) | 200 | 200 | — | — |
| Amount of o-cresol | (g) | — | — | 200 | 200 |
| Amount of m-cresol | (g) | — | — | — | — |
| Amount of Acid catalyst (PTS) | (g) | 5 | 5 | 5 | 5 |
| Reaction temperature | (° C.) | 180 | 200 | 140 | 160 |
| Reaction time | (min.) | 120 | 120 | 120 | 120 |
| Solvent for dilution | — | toluene/MIBK | toluene/MIBK | toluene/MIBK | toluene/MIBK |
| Amount of Reaction product | (g) | 205 | 196 | 192 | 195 |
| Viscosity at 150° C. (ICI viscomener) | (p) | 0.5 | 0.2 | 1.7 | 1.0 |
| Number average molecular weight (GPC) | — | 350 | 330 | 452 | 420 |
| OH equivalent | — | 120 | 126 | 135 | 140 |

TABLE 2-3

|  |  | Example 9 | Example 10 | Comparative Example 1 |
|---|---|---|---|---|
| Amount of Powdery modified phenolic resin | (g) | 100 | — | 100 |
| Amount of Vanish modified phenolic resin | (g) | — | 200 | — |
| Amount of Phenol | (g) | — | 200 | 200 |
| Amount of o-cresol | (g) | — | — | — |
| Amount of m-cresol | (g) | 200 | — | — |

TABLE 2-3-continued

|  |  | Example 9 | Example 10 | Comparative Example 1 |
|---|---|---|---|---|
| Amount of Acid catalyst | (g) (PTS) | 5 | 5 | 5 |
| Reaction temperature | (° C.) | 140 | 160 | 95 |
| Reaction time | (min.) | 120 | 120 | 120 |
| Solvent for dilution | — | toluene/ MIBK | toluene/ MIBK | toluene/ MIBK |
| Amount of Reaction product | (g) | 185 | 200 | 175 |
| Viscosity at 150° C. (ICI viscomener) | (p) | 3.0 | 0.8 | 5.5 |
| Number average molecular weight (GPC) | — | 448 | 370 | 550 |
| OH equivalent | — | 134 | 120 | 127 |

TABLE 3-1

|  |  |  | Example 11 | Example 12 | Example 13 |
|---|---|---|---|---|---|
| Modified phenolic resin | Example 3 | parts by weight | 9.17 |  |  |
|  | Example 4 | parts by weight |  | 9.31 |  |
|  | Example 5 | parts by weight |  |  | 9.17 |
|  | Example 7 | parts by weight |  |  |  |
|  | Example 8 | parts by weight |  |  |  |
|  | Example 9 | parts by weight |  |  |  |
|  | Example 10 | parts by weight |  |  |  |
|  | Comparative Example 1 | parts by weight |  |  |  |
| Epoxy resin | YX-4000H | parts by weight | 14.89 | 14.75 | 14.89 |
| Curing accelerator | TPP | parts by weight | 0.49 | 0.49 | 0.49 |
| Fused silica | CRS1102-GT200T | parts by weight | 75 | 75 | 75 |
| Camauba wax |  | parts by weight | 0.25 | 0.25 | 0.25 |
| Carbon black |  | parts by weight | 0.20 | 0.20 | 0.20 |
| Gelation time |  | (170° C./sec) | 46 | 46 | 52 |
| Shore hardness just after molding |  | — | 75 | 75 | 70 |
| Glass transition temperature (Tg) |  | (° C.) | 128 | 124 | 125 |
| Flexural strength | room temperature | (kgf/mm$^2$) | 17 | 10 | 15 |
| Flexural modulus | room temperature | (kgf/mm$^2$) | 1890 | 1920 | 1920 |
| Moisture absorption | 85° C./85%-72 hr | (wt. %) | 0.210 | 0.207 | 0.203 |
|  | 85° C./85%-168 hr | (wt. %) | 0.300 | 0.293 | 0.289 |

TABLE 3-2

|  |  |  | Example 14 | Example 15 | Example 16 |
|---|---|---|---|---|---|
| Modified phenolic resin | Example 3 | parts by weight |  |  |  |
|  | Example 4 | parts by weight |  |  |  |
|  | Example 5 | parts by weight |  |  |  |
|  | Example 7 | parts by weight | 9.84 |  |  |
|  | Example 8 | parts by weight |  | 10.05 |  |
|  | Example 9 | parts by weight |  |  | 9.80 |
|  | Example 10 | parts by weight |  |  |  |
|  | Comparative Example 1 | parts by weight |  |  |  |
| Epoxy resin | YX-4000H | parts by weight | 14.22 | 14.01 | 14.26 |
| Curing accelerator | TPP | parts by weight | 0.49 | 0.49 | 0.49 |
| Fused silica | CRS1102-GT200T | parts by weight | 75 | 75 | 75 |
| Camauba wax |  | parts by weight | 0.25 | 0.25 | 0.25 |
| Carbon black |  | parts by weight | 0.20 | 0.20 | 0.20 |
| Gelation time |  | (170° C./sec) | 53 | 55 | 46 |
| Shore hardness just after molding |  | — | 64 | 70 | 67 |
| Glass transition temperature (Tg) |  | (° C.) | 122 | 120 | 132 |
| Flexural strength | room temperature | (kgf/mm$^2$) | 12 | 16 | 12 |
| Flexural modulus | room temperature | (kgf/mm$^2$) | 1840 | 1950 | 1920 |
| Moisture absorption | 85° C./85%-72 hr | (wt. %) | 0.193 | 0.185 | 0.194 |
|  | 85° C./85%-168 hr | (wt. %) | 0.286 | 0.270 | 0.285 |

TABLE 3-3

|  |  |  | Example 17 | Comparative Example 2 |
|---|---|---|---|---|
| Modified phenolic resin | Example 3 | parts by weight |  |  |
|  | Example 4 | parts by weight |  |  |
|  | Example 5 | parts by weight |  |  |
|  | Example 7 | parts by weight |  |  |
|  | Example 8 | parts by weight |  |  |
|  | Example 9 | parts by weight |  |  |
|  | Example 10 | parts by weight | 9.17 |  |
|  | Comparative Example 1 | parts by weight |  | 9.48 |
| Epoxy resin | YX-4000H | parts by weight | 14.89 | 14.58 |
| Curing accelerator | TPP | parts by weight | 0.49 | 0.49 |
| Fused silica | CRS1102-GT200T | parts by weight | 75 | 75 |
| Camauba wax |  | parts by weight | 0.25 | 0.25 |
| Carbon black |  | parts by weight | 0.20 | 0.20 |
| Gelation time |  | (170° C./sec) | 46 | 60 |
| Shore hardness just after molding |  | — | 75 | 77 |
| Glass transition temperature (Tg) |  | (° C.) | 120 | 140 |
| Flexural strength | room temperature | (kgf/mm$^2$) | 16 | 15 |
| Flexural modulus | room temperature | (kgf/mm$^2$) | 1950 | 1800 |

TABLE 3-3-continued

|  |  |  | Example 17 | Comparative Example 2 |
|---|---|---|---|---|
| Moisture absorption | 85° C./85%-72 hr | (wt. %) | 0.200 | 0.220 |
|  | 85° C./85%-168 hr | (wt. %) | 0.290 | 0.316 |

TABLE 4-1

|  |  |  | Example 18 | Example 19 | Example 20 |
|---|---|---|---|---|---|
| Modified phenolic resin | Example 1 | parts by weight | 9.39 |  |  |
|  | Example 2 | parts by weight |  | 9.19 |  |
|  | Example 3 | parts by weight |  |  | 9.19 |
|  | Example 6 | parts by weight |  |  |  |
|  | Example 8 | parts by weight |  |  |  |
|  | Example 10 | parts by weight |  |  |  |
|  | Comparative Example 1 | parts by weight |  |  |  |
| Epoxy resin | EOCN1020 | parts by weight | 14.91 | 15.11 | 15.11 |
| Curing accelerator | TPP | parts by weight | 0.25 | 0.25 | 0.25 |
| Fused silica | CRS1102-GT200T | parts by weight | 75 | 75 | 75 |
| Carnauba wax |  | parts by weight | 0.25 | 0.25 | 0.25 |
| Carbon black |  | parts by weight | 0.20 | 0.20 | 0.20 |
| Gelation time |  | (170° C./sec) | 44 | 50 | 55 |
| Shore hardness just after molding |  | — | 85 | 85 | 85 |
| Glass transition temperature (Tg) |  | (° C.) | 169 | 167 | 160 |
| Flexural strength | room temperature | (kgf/mm$^2$) | 17 | 19 | 18 |
| Flexural modulus | room temperature | (kgf/mm$^2$) | 1880 | 1900 | 1900 |
| Moisture absorption | 85° C./85%-72 hr | (wt. %) | 0.217 | 0.207 | 0.200 |
|  | 85° C./85%-168 hr | (wt. %) | 0.315 | 0.306 | 0.300 |

TABLE 4-2

|  |  |  | Example 21 | Example 22 |
|---|---|---|---|---|
| Modified phenolic resin | Example 1 | parts by weight |  |  |
|  | Example 2 | parts by weight |  |  |
|  | Example 3 | parts by weight |  |  |
|  | Example 6 | parts by weight | 9.48 |  |
|  | Example 8 | parts by weight |  | 10.10 |
|  | Example 10 | parts by weight |  |  |
|  | Comparative Example 1 | parts by weight |  |  |
| Epoxy resin | EOCN1020 | parts by weight | 14.82 | 14.20 |
| Curing accelerator | TPP | parts by weight | 0.25 | 0.25 |
| Fused silica | CRS1102-GT200T | parts by weight | 75 | 75 |
| Carnauba wax |  | parts by weight | 0.25 | 0.25 |
| Carbon black |  | parts by weight | 0.20 | 0.20 |
| Gelation time |  | (170° C./sec) | 56 | 65 |
| Shore hardness just after molding |  | — | 85 | 83 |
| Glass transition temperature (Tg) |  | (° C.) | 160 | 145 |
| Flexural strength | room temperature | (kgf/mm$^2$) | 18 | 19 |
| Flexural modulus | room temperature | (kgf/mm$^2$) | 1890 | 1900 |
| Moisture absorption | 85° C./85%-72 hr | (wt. %) | 0.192 | 0.175 |
|  | 85° C./85%-168 hr | (wt. %) | 0.289 | 0.258 |

TABLE 4-3

|  |  |  | Example 23 | Comparative Example 3 |
|---|---|---|---|---|
| Modified phenolic resin | Example 1 | parts by weight |  |  |
|  | Example 2 | parts by weight |  |  |
|  | Example 3 | parts by weight |  |  |
|  | Example 6 | parts by weight |  |  |
|  | Example 8 | parts by weight |  |  |
|  | Example 10 | parts by weight | 9.19 |  |
|  | Comparative Example 1 | parts by weight |  | 9.53 |
| Epoxy resin | EOCN1020 | parts by weight | 15.11 | 14.77 |
| Curing accelerator | TPP | parts by weight | 0.25 | 0.25 |
| Fused silica | CRS1102-GT200T | parts by weight | 75 | 75 |
| Carnauba wax |  | parts by weight | 0.25 | 0.25 |
| Carbon black |  | parts by weight | 0.20 | 0.20 |
| Gelation time |  | (170° C./sec) | 57 | 40 |
| Shore hardness just after molding |  | — | 85 | 85 |
| Glass transition temperature (Tg) |  | (° C.) | 158 | 169 |
| Flexural strength | room temperature | (kgf/mm$^2$) | 18 | 18 |
| Flexural modulus | room temperature | (kgf/mm$^2$) | 1900 | 1800 |
| Moisture absorption | 85° C./85%-72 hr | (wt. %) | 0.198 | 0.235 |
|  | 85° C./85%-168 hr | (wt. %) | 0.296 | 0.344 |

TABLE 5-1

|  |  | Example 24 | Example 25 | Example 26 | Example 27 |
|---|---|---|---|---|---|
| Amount of Powdery modified phenolic resin | (g) | 100 | 100 | 100 | 100 |
| Amount of Vanish modified phenolic resin | (g) | — | — | — | — |
| Amount of α-naphthol | (g) | 250 | 250 | 250 | 250 |
| Amount of β-naphthol | (g) | — | — | — | — |
| Amount of Phenol | (g) | — | — | — | — |
| Amount of Acid catalyst | (g) | 5 | 5 | 5 | 5 |

TABLE 5-1-continued

|  |  | Example 24 | Example 25 | Example 26 | Example 27 |
|---|---|---|---|---|---|
| Reaction temperature | (° C.) | 120 | 140 | 160 | 180 |
| Reaction time | (min.) | 120 | 120 | 120 | 120 |
| Solvent for dilution | — | MIBK | MIBK | MIBK | MIBK |
| Amount of Reaction product | (g) | 230 | 243 | 250 | 258 |
| Viscosity at 150° C. (ICI viscomener) | (p) | 4.4 | 4 | 2 | 1.2 |
| Number average molecular weight (GPC) | — | 535 | 486 | 428 | 370 |
| OH equivalent | — | 185 | 180 | 178 | 176 |

TABLE 5-2

|  |  | Example 28 | Example 29 | Example 30 |
|---|---|---|---|---|
| Amount of Powdery modified phenolic resin | (g) | 100 | 100 | — |
| Amount of Vanish modified phenolic resin | (g) | — | — | 200 |
| Amount of α-naphtho | (g) | 101 | — | 250 |
| Amount of β-naphthol | (g) | — | 200 | — |
| Amount of Phenol | (g) | 132 | — | — |
| Amount of Acid catalyst | (g) | 5 | 5 | 5 |
| Reaction temperature | (° C.) | 160 | 140 | 120 |
| Reaction time | (min.) | 60 | 60 | 120 |
| Solvent for dilution | — | toluene/MIBK | MIBK | MIBK |
| Amount of Reaction product | (g) | 220 | 220 | 230 |
| Viscosity at 150° C. (ICI viscomener) | (p) | 4.1 | 4.3 | 4.4 |
| Number average molecular weight (GPC) | — | 563 | 560 | 523 |
| OH equivalent | — | 149 | 185 | 185 |

TABLE 6-1

|  |  |  | Example 31 | Example 32 | Example 33 |
|---|---|---|---|---|---|
| Modified phenolic resin | Example 4 | parts by weight |  |  |  |
|  | Example 24 | parts by weight | 11.71 |  |  |
|  | Example 25 | parts by weight |  | 11.54 |  |
|  | Example 26 | parts by weight |  |  | 11.49 |
|  | Example 27 | parts by weight |  |  |  |
|  | Example 28 | parts by weight |  |  |  |
|  | Example 29 | parts by weight |  |  |  |
|  | Example 30 | parts by weight |  |  |  |
| Epoxy resin | YX-4000H | parts by weight | 12.35 | 12.52 | 12.57 |
| Curing accelerator | TPP | parts by weight | 0.49 | 0.49 | 0.49 |
| Fused silica | CRS1102-GT200T | parts by weight | 75 | 75 | 75 |
| Carnuba wax |  | parts by weight | 0.25 | 0.25 | 0.25 |
| Carbon black |  | parts by weight | 0.20 | 0.20 | 0.20 |
| Gelation time |  | (170° C./sec) | 45 | 47 | 50 |
| Shore hardness just after molding |  | — | 73 | 73 | 73 |
| Glass transition temperature (Tg) |  | (° C.) | 162 | 160 | 158 |
| Flexural strength | room temperature | (kgf/mm$^2$) | 16 | 15 | 15 |
| Flexural modulus | room temperature | (kgf/mm$^2$) | 1870 | 1820 | 1830 |
| Moisture absorption | 85° C./85%-72 hr | (wt. %) | 0.159 | 0.154 | 0.149 |
|  | 85° C./85%-168 hr | (wt. %) | 0.230 | 0.220 | 0.212 |

TABLE 6-2

|  |  |  | Example 34 | Example 35 | Example 36 |
|---|---|---|---|---|---|
| Modified phenolic resin | Example 4 | parts by weight |  |  |  |
|  | Example 24 | parts by weight |  |  |  |
|  | Example 25 | parts by weight |  |  |  |
|  | Example 26 | parts by weight |  |  |  |
|  | Example 27 | parts by weight | 11.42 |  |  |
|  | Example 28 | parts by weight |  | 10.41 |  |
|  | Example 29 | parts by weight |  |  | 11.71 |
|  | Example 30 | parts by weight |  |  |  |
| Epoxy resin | YX-4000H | parts by weight | 12.64 | 13.65 | 12.35 |
| Curing accelerator | TPP | parts by weight | 0.49 | 0.49 | 0.49 |
| Fused silica | CRS1102-GT200T | parts by weight | 75 | 75 | 75 |
| Camauba wax |  | parts by weight | 0.25 | 0.25 | 0.25 |
| Carbon black |  | parts by weight | 0.20 | 0.20 | 0.20 |
| Gelation time |  | (170° C./sec) | 54 | 53 | 58 |
| Shore hardness just after molding |  | — | 71 | 67 | 67 |
| Glass transition temperature (Tg) |  | (° C.) | 158 | 144 | 152 |
| Flexural strength | room temperature | (kgf/mm$^2$) | 16 | 16 | 13 |
| Flexural modulus | room temperature | (kgf/mm$^2$) | 1850 | 1800 | 1770 |
| Moisture absorption | 85° C./85%-72 hr | (wt. %) | 0.135 | 0.190 | 0.148 |
|  | 85° C./85%-168 hr | (wt. %) | 0.198 | 0.273 | 0.219 |

TABLE 6-3

|  |  |  | Example 37 | Example 38 |
|---|---|---|---|---|
| Modified phenolic resin | Example 4 | parts by weight |  | 5.18 |
|  | Example 24 | parts by weight |  | 5.18 |
|  | Example 25 | parts by weight |  |  |
|  | Example 26 | parts by |  |  |

TABLE 6-3-continued

|  |  |  | Example 37 | Example 38 |
|---|---|---|---|---|
|  | Example 27 | parts by weight |  |  |
|  | Example 28 | parts by weight |  |  |
|  | Example 29 | parts by weight |  |  |
|  | Example 30 | parts by weight | 11.71 |  |
| Epoxy resin | YX-4000H | parts by weight | 12.35 | 13.71 |
| Curing accelerator | TPP | parts by weight | 0.49 | 0.49 |
| Fused silica | CRS1102-GT200T | parts by weight | 75 | 75 |
| Camauba wax |  | parts by weight | 0.25 | 0.25 |
| Carbon black |  | parts by weight | 0.20 | 0.20 |
| Gelation time |  | (170° C./sec) | 45 | 47 |
| Shore hardness just after molding |  | — | 73 | 70 |
| Glass transition temperature (Tg) |  | (° C.) | 161 | 140 |
| Flexural strength | room temperature | (kgf/mm$^2$) | 16 | 14 |
| Flexural modulus | room temperature | (kgf/mm$^2$) | 1860 | 1850 |
| Moisture absorption | 85° C./85%-72 hr | (wt. %) | 0.158 | 0.183 |
|  | 85° C./85%-168 hr | (wt. %) | 0.229 | 0.260 |

TABLE 7-1

|  |  |  | Example 39 | Example 40 | Example 41 |
|---|---|---|---|---|---|
| Modified phenolic | Example 24 | parts by weight | 11.76 |  |  |
|  | Example 25 | parts by weight |  | 11.59 |  |
|  | Example 26 | parts by weight |  |  | 11.54 |
|  | Example 27 | parts by weight |  |  |  |
|  | Example 28 | parts by weight |  |  |  |
|  | Example 29 | parts by weight |  |  |  |
|  | Example 30 | parts by weight |  |  |  |
| Epoxy resin | EOCN1020 | parts by weight | 12.54 | 12.71 | 12.76 |
| Curing accelerator | TPP | parts by weight | 0.25 | 0.25 | 0.25 |
| Fused silica | CRS1102-GT200T | parts by weight | 75 | 75 | 75 |
| Camauba wax |  | parts by weight | 0.25 | 0.25 | 0.25 |
| Carbon black |  | parts by weight | 0.20 | 0.20 | 0.20 |
| Gelation time |  | (170° C./sec) | 42 | 44 | 48 |
| Shore hardness just after molding |  | — | 84 | 83 | 82 |
| Glass transition temperature (Tg) |  | (° C.) | 189 | 187 | 185 |
| Flexural strength | room temperature | (kgf/mm$^2$) | 18 | 17 | 17 |
| Flexural modulus | room temperature | (kgf/mm$^2$) | 1900 | 1890 | 1800 |
| Moisture absorption | 85° C./85%-72 hr | (wt. %) | 0.164 | 0.152 | 0.146 |
|  | 85° C./85%-168 hr | (wt. %) | 0.237 | 0.224 | 0.220 |

TABLE 7-2

|  |  |  | Example 42 | Example 43 |
|---|---|---|---|---|
| Modified phenolic | Example 24 | parts by weight |  |  |
|  | Example 25 | parts by weight |  |  |
|  | Example 26 | parts by weight |  |  |
|  | Example 27 | parts by weight | 11.47 |  |
|  | Example 28 | parts by weight |  | 10.47 |
|  | Example 29 | parts by weight |  |  |
|  | Example 30 | parts by weight |  |  |
| Epoxy resin | EOCN1020 | parts by weight | 12.83 | 13.83 |
| Curing accelerator | TPP | parts by weight | 0.25 | 0.25 |
| Fused silica | CRS1102-GT200T | parts by weight | 75 | 75 |
| Camauba wax |  | parts by weight | 0.25 | 0.25 |
| Carbon black |  | parts by weight | 0.20 | 0.20 |
| Gelation time |  | (170° C./sec) | 49 | 48 |
| Shore hardness just after molding |  | — | 80 | 77 |
| Glass transition temperature (Tg) |  | (° C.) | 184 | 175 |
| Flexural strength | room temperature | (kgf/mm$^2$) | 16 | 18 |
| Flexural modulus | room temperature | (kgf/mm$^2$) | 1790 | 1800 |
| Moisture absorption | 85° C./85%-72 hr | (wt. %) | 0.128 | 0.203 |
|  | 85° C./85%-168 hr | (wt. %) | 0.189 | 0.297 |

TABLE 7-3

|  |  |  | Example 44 | Example 45 |
|---|---|---|---|---|
| Modified phenolic | Example 24 | parts by weight |  |  |
|  | Example 25 | parts by weight |  |  |
|  | Example 26 | parts by weight |  |  |
|  | Example 27 | parts by weight |  |  |
|  | Example 28 | parts by weight |  |  |
|  | Example 29 | parts by weight | 11.76 |  |
|  | Example 30 | parts by weight |  | 11.76 |
| Epoxy resin | EOCN1020 | parts by weight | 12.54 | 12.54 |
| Curing accelerator | TPP | parts by weight | 0.25 | 0.25 |
| Fused silica | CRS1102-GT200T | parts by weight | 75 | 75 |
| Camauba wax |  | parts by weight | 0.25 | 0.25 |
| Carbon black |  | parts by weight | 0.20 | 0.20 |
| Gelation time |  | (170° C./sec) | 54 | 42 |
| Shore hardness just after molding |  | — | 74 | 85 |
| Glass transition temperature (Tg) |  | (° C.) | 178 | 188 |
| Flexural strength | room temperature | (kgf/mm$^2$) | 14 | 18 |
| Flexural modulus | room temperature |  | 1760 | 1890 |

TABLE 7-3-continued

|  |  |  | Example 44 | Example 45 |
|---|---|---|---|---|
| modulus | temperature |  |  |  |
| Moisture | 85° C./85%-72 hr | (wt. %) | 0.151 | 0.165 |
| absorption | 85° C./85%-168 hr | (wt. %) | 0.218 | 0.236 |

We claim:

1. A molding material based on a modified phenolic resin comprising:

(A) a low-melt-viscosity modified phenolic resin having a resin melt viscosity at 150° C. of from 0.2 to 4.5 poises obtained by polycondensating a petroleum heavy oil or pitch, a formaldehyde polymer, and a phenol in the presence of an acid catalyst to prepare a modified phenolic resin; and reacting the resultant modified phenolic resin with a phenol at a temperature of from 140° C. and not more than 200° C. in the presence of the acid catalyst to lower the molecular weight of the modified phenolic resin; and (B) an epoxy resin.

2. A molding material based on the modified phenolic resin as claimed in claim 1 wherein the highly reactive low-viscosity modified phenolic resin has the resin melt viscosity at 150° C. of from 0.2 to 3.0 poises.

3. A molding material based on the modified phenolic resin as claimed in claim 1 wherein the highly reactive low-viscosity modified phenolic resin has the resin melt viscosity at 150° C. of from 1.0 to 4.5 poises.

4. A molding material based on the modified phenolic resin as claimed in claim 1 further comprising (C) a curing agent and/or a curing accelerator, and (D) an inorganic filler.

5. A molding material based on the modified phenolic resin as claimed in claim 1 wherein the highly reactive low-viscosity modified phenolic resin (A) is mixed with the epoxy resin (B) in a ratio of 10:90 to 90:10 parts by weight.

6. A material for electrical and electronic parts which is produced by molding the molding material based on the modified phenolic resin as claimed in claim 1.

7. A semiconductor sealer which is made from the molding material based on the modified phenolic resin as claimed in claim 1.

* * * * *